Figure 1:
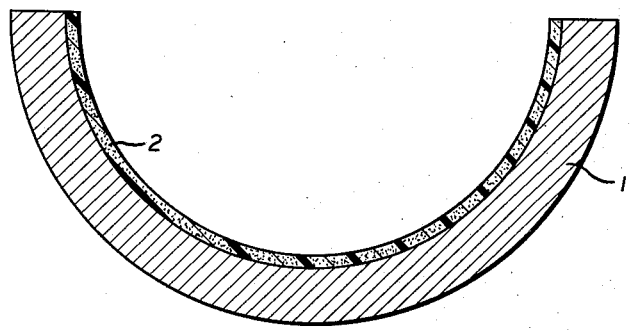

Sept. 24, 1957    O. SCHUBERT, SR., ET AL    2,807,510
BEARINGS
Filed Aug. 17, 1956

INVENTORS
OTTO SCHUBERT SR.
OTTO SCHUBERT JR.
BY
*Mock + Blum*
ATTORNEYS.

United States Patent Office 2,807,510
Patented Sept. 24, 1957

2,807,510

BEARINGS

Otto Schubert, Sr., Ehringshausen, and Otto Schubert, Jr., Giessen, Germany

Application August 17, 1956, Serial No. 604,655

11 Claims. (Cl. 308—238)

This invention relates to improved bearings and has particular relation to bearings in which a layer or coating of a polymerized synthetic, heat-hardenable resinous composition of the type described hereinafter is fixedly secured or connected to a metallic backing.

Bearings made of synthetic resins or resin compositions according to known processes, have in general a great resistance to wear and therefore a long life period, combined with good damping capacity, are noiseless in operation and characterized by excellent elasticity. A particular advantage of these bearings consists in their low sensitivity to small particles of foreign substance which may penetrate into the bearing because such particles can become embedded in a synthetic resinous layer, while in the case of metals such foreign particles may cause destruction of the bearing. Moreover, the low specific weight of the synthetic resin products results in considerable reduction of the weight and the easy moldability and high chemical resistance of synthetic resins result in further advantages which cannot be obtained in the use of metallic materials. Finally, in contrast to certain bearing metals, synthetic resins have in general no catalytic effect which may adversely affect lubricants used in the bearings.

However, in addition to the above mentioned considerable advantages over metallic bearings, bearings comprising synthetic resin compositions have also one considerable disadvantage, i. e., the low heat-conducting capacity of synthetic resins. The thermal conductivity of synthetic resins is about 200 times lower than that of metals so that the frictional heat produced during operation of the bearing accumulates in the surface layer of the artificial resin composition and this heat must be carried away mainly by the lubricant or the shaft, because otherwise charring of the synthetic resinous surface layer takes place and the bearing is destroyed within a relatively short period of time. In view of the fact that all changes in bearing clearance which are caused, e. g., by swelling, shrinking or thermal expansion, are dependent on temperature and the bearing strength is also substantially affected by the temperature of the bearing, all steps which result in a reduction of the bearing temperatures favorably influence the economy and efficiency of synthetic resin bearings.

In order to reduce accumulation of heat in the artificial resin layer of bearings, various suggestions have been made previously.

According to one of these suggestions, removal of the frictional heat should be facilitated by increased lubrication, by providing the synthetic resinous layer with pores formed by incorporation of fine metallic particles in the resin layer and subsequent treatment with acid in order to dissolve the embedded metallic particles.

According to another suggestion, a thin foil of artificial resin was applied to a metallic backing which was supposed to carry away heat accumulating in the resin foil. It has been found, however, that it is rather difficult to obtain a satisfactory, durable connection between the metallic backing and the synthetic resin foil.

It has been found that the above described prior suggestions could not satisfactorily meet all requirements, and could not be considered a satisfactory combination of the favorable properties of synthetic resin with the advantages of metals in bearings. For example, in the manufacture of compound bearings having a somewhat complicated shape, there is always a danger of breakage at points of abrupt changes of shape, whereby the strength and safety of the bearing is considerably affected. Moreover, the molds are expensive and can be economically used only in mass production. Bearings composed of metals and resinous foils were not satisfactory owing to poor connection between metal and foil.

The main object of the present invention is to provide compound bearings which are composed of metal and synthetic resinous compositions, the surface of which is superior to bearings known from the art and can be satisfactorily and successfully used without the occurrence of disadvantages encountered in prior art compound bearings.

The bearing embodying the present invention consist of a metallic backing which may have any desired shape and size and is provided with a thin layer or coating of a novel and improved synthetic resinous composition applied to said backing. These coatings are made of particles of cleavable aluminum silicates, preferably mica, and hardenable, well-adhering synthetic resins of the type described hereinafter, which cause cleavage of the particles of mica or the like, incorporated in such resins. Upon subjecting the composition containing mica or the like and synthetic resin, to hardening by heating without the application of excess pressure, preferably under atmospheric pressure, these resins undergo shrinkage and cause splitting or cleavage of the mica or the like particles incorporated therein, with the formation of capillaries in the resinous layer.

In carrying out the present invention, the mixture of synthetic resin of the type described hereinafter with particles of mica or the like, if desired with the addition of a solvent and/or diluent, is applied to the metallic backing to form a thin layer thereon and the coating thus formed is then subjected to hardening by heating under atmospheric pressure or a lower pressure.

It has been found that resinous surface layers prepared in this manner show an excellent adhesion to the metallic backing, and that the heat produced in the bearing by friction is removed by the lubricant, as well as the metallic backing, owing to the thinness of the resinous layer and the capillaries formed therein according to the present invention.

Furthermore, it has been found that such surface resinous layers containing capillaries accumulate lubricant and that, therefore, during use of the bearing, there will always be a thin film of lubricant between the adjacent surfaces of shaft and bearing at rest condition as well as during operation. The presence of such film eliminates undue friction and undue heat formation, and thus prevents premature wear and tear of the bearing.

The synthetic resins used in carrying out the present invention have a good adhesive power relative to the particles of mica or other aluminum silicate used, as well as relative to the metallic backing, and are capable of causing splitting of the mica or the like particles during hardening under the above described conditions. It has been found that the synthetic resinous surface layers thus obtained are permeated by capillary-active hollow spaces which extend primarily in perpendicular direction to the bearing surface and at least part of which are connected to each other. Thus, the resinous surface layer will always contain a relatively considerable reserve of the lubricant in available form. In the formation of the capillaries, the strong adhesion of the synthetic resin to the particles of cleavable aluminum silicate, such as mica, and the shrinking of the resin are utilized in order to cause splitting by contractile forces during hardening. The temperature of hardening depend on the type of synthetic resin used, whereby, in general, shrinking is increased upon increasing the temperatures, so that the contractile forces are likewise increased and an optimum formation of capillaries in the synthetic resinous layer occurs. It has been found that cleavage of the mica, or the like, particles occurs only in hardening under atmospheric pressure or lower pressures, and does not occur if hardening is carried out by the simultaneous application of heat and pressure.

The bearings according to the present invention have—in addition to the presence of capillary spaces for taking up a reserve of the lubricant—also other important advantages. In proceeding according to this invention, backing bodies of any desired shape can be provided in a simple manner with the synthetic resinous sliding surface and damaged surfaces of bearings can be easily mended. Furthermore, the thickness of the artificial resinous layer can be as low as desired. Very satisfactory results have been obtained by the application of resinous layers having a thickness in the range of 0.1 to 0.3 mm., whereby the bulk of frictional heat is in fact removed through the metallic backing of the bearing.

In the bearings according to the present invention, heat conduction through the thin layer of the resinous composition to the backing metal through the capillaries filled with lubricant is particularly effective, because heat exchange is faster in liquids due to movement of the molecules in the liquid. Thus, the capillaries formed by splitting the mica, or the like, particles, serve, on the one hand, for taking up lubricant, and, on the other hand, for securing an improved heat conduction to the metallic backing, and from the latter to the surrounding atmosphere.

Accumulation of lubricants in the interior of the resinous surface layer, according to the present invention, is an essential technical advantage because the bearing is provided with sufficient amounts of lubricant, even at considerable variations of the load and even at endangered spots, for example, at the seating of the shaft on the bearing. As the result of this, the sliding conditions will be very favorable and the life period of the bearing is considerably increased.

The lubrication phenomena will now be explained by way of examples in connection with a rotatably arranged shaft in a bearing according to the present invention.

The capillary-active hollow spaces or ducts of the sliding surface layer formed by the resinous composition are filled with lubricant by impregnation and, by the capillary-action, they withhold by their funnel-shaped openings to the surface, additional amounts of oil. In view of the great number of capillary openings, the drops of oil located at the openings of the capillaries can easily flow together and form a substantially coherent film of oil. In rest position, the shaft is seated on a portion of the surface of the resinous coating, and a continuous film of oil is formed at this contact surface between shaft and sliding surface. In this manner there will be a connection between the oil located in the capillaries and the surface of the metal shaft. If, now, the shaft is rotated, it will be elastically pressed against the sliding surface of the resinous layer and as a consequence of this, from the directly adjacent capillaries oil will be forced to the surface and added to the oil film already formed. In this manner a relatively thick oil cushion is formed in the direction of rotation of the shaft and any danger of substantially damaging the sliding surface or the shaft owing to friction by solid particles during starting, is safely eliminated. Similar favorable conditions will occur when rotation of the shaft is stopped.

The behavior of the bearing provided with capillaries according to the present invention is excellent in emergency situations. If, for any reasons, the supply of lubricant to the bearing is interrupted, the bearing which contains a substantial reserve of lubricant can be continued to be operated without trouble and can compensate for the deficiency in the supply of lubricant by supplying oil or the like from the reserve present in the capillaries for a considerable period of time.

The synthetic resins used in carrying out the invention must meet the following conditions:

The resins must be hardenable and show shrinkage upon hardening. Furthermore, they must have a satisfactory cohesion and very good adhesion, particularly to inorganic materials. It is preferred to use resins which, in addition to a purely mechanical anchoring effect, are distinguished by intra-molecular attraction forces (e. g., by the formation of hydrogen bonds) because such resins have a particular adhesion which is utilized in the range of contact between metallic backing and synthetic resin coating so that, on the one hand, an excellent joint between metal and synthetic resin layer is obtained and, on the other hand, during hardening according to the present invention, an optimum splitting effect of the mica, or the like, and a correspondingly favorable optimum formation of the capillaries take place.

In carrying out this invention, hardenable epoxy resins, i. e., conventional combinations of epoxy resins with additions having a cross-linking effect, are preferred for forming the resinous layer or coating. Epoxy resins can be prepared, for example, by condensation of epichlorhydrine or dichlorhydrines with bisphenols. The molecular weight of the resins thus formed varies, depending on the conditions of condensation. Such condensation products which contain highly active epoxy end groups and regularly spaced reactive hydroxyl groups are not hardenable by themselves. However, they can be rendered hardenable by combination with conventional cross-linking agents and the combination products thus formed are denoted as hardenable epoxy resins. The reaction of hardening or cross-linking, which results in the desired characteristics of the synthetic resin layer, is determined by, and dependent on, the nature of the combination elements on the one hand (where their functionality plays a decisive role) and by the reaction mechanism on the other hand. These factors—in dependence on the temperature—cause cross-linking of the epoxy groups, the hydroxyl groups, or both groups. As examples of additions having a cross-linking effect, the following are mentioned: polyamines or polyamides, such as ethylene diamine, diethylene triamine, piperidine, urea, dicyandiamide, and the like, polycarboxylic acids or their anhydrides, such as phthalic acid anhydride, maleic acid anhydride and the like. Furthermore, phenol-formaldehyde resins and amine resins, such as urea-formaldehyde resins, malamine-formaldehyde resins and dicyandiamide resins, as well as alcoholates of polyvalent metals, e. g., aluminum alcoholate or titanium alcoholate, or synthetic resins formed by reacting such metal alcoholates with keto-enol compounds of tautomer reaction, can be used with excellent results cross-linking agents for the epoxy resins. By variation of the components of the synthetic resinous layer of the bearings, it is possible to obtain sliding surfaces consisting of synthetic resin compositions which are characterized by the desired properties, such as excellent cohesion, high chemical stability, extraordinary elasticity, hardness and resistance to abrasion.

The above described hardenable synthetic resinous products are mixed with an aluminum silicate of a laminated or flake-like structure, such as mica, whereby the proportion by weight of synthetic resin to mica should preferably amount to about 2:1. The proportion of mica in the resin mica composition can amount up to 50%, based on the total weight of the resinous composition, with the exclusion of the solvents.

The resinous layer or coating according to this invention may be made also of hardenable phenol-aldehyde resins, particularly hardenable phenol-formaldehyde resins by themselves or of mixtures of these phenolic resins with hardenable epoxy resins.

The following examples describe some embodiments of and best modes for carrying out the invention, to which the invention is not limited.

Example I

An epoxy resin is prepared by condensation of 1 mol of bis-phenol with 1.5 mols of epichlorhydrine in alkaline solution at 80° C. 44 parts of the resin thus formed are dissolved in 3.8 parts of xylene, 4.1 parts of ethylene glycol and 17.1 parts of diacetone alcohol, forming 69 parts solution. This solution is mixed with 13.7 parts of a second solution containing 1.3 parts of adipic acid, 0.7 part of dicyandiamide and 5.5 parts of a melamine-formaldehyde resin prepared by condensation of 1 mol melamine with 6 mols formaldehyde and etherified with at least 1 mole of n-butanol for each methylol-group, these ingredients being dissolved in 3.7 parts of ethylene glycol and 2.5 parts of diacetone alcohol. Prior to the mixing with the epoxy resin solution, the cross-linking agents are held at temperatures in the range between 80° and 120° C. until complete homogenizing is attained.

The resulting mixed solution is diluted with 17.3 parts of xylene and the diluted solution which contains the epoxy resin and the cross-linking agents, is mixed under good stirring with 40 parts of mica of the particle size described hereinafter.

Example II 30 parts by weight of a synthetic resin composition prepared from an epoxy resin and a hardenable phenol-formaldehyde resin are dissolved in 40 parts by weight of a solvent mixture consisting of equal parts by weight of toluene and ethylene glycol. To this solution, 30 parts by weight of comminuted mica are added under stirring. The mica particles are of the size described hereinafter.

The synthetic resin mixture used in this example is prepared from 70 parts by weight of the epoxy resin described in Example I and 30 parts by weight of a phenol-formaldehyde resin prepared in conventional manner by condensation of 1 mol of phenol and 1.1 mol of formaldehyde in the presence of ammonia as a catalyst.

Example III 34 parts by weight of a hardenable phenol-formaldehyde resin prepared in conventional manner by condensation of one mol of phenol and 0.8 to 1.2 mols of formaldehyde in the presence of ammonia as catalyst, are dissolved in 40 parts by weight of butanol. To the resulting solution, 26 parts by weight of mica, consisting of particles as described in Example II, are added.

Example IV 69 parts of a solution are prepared by dissolving 44 parts of the epoxy resin obtained by condensation of 1 mol of bis-phenol and 1.5 mols of epichlorhydrine in alkaline solution at about 80° C., in the manner described in the above Example I, in 6.2 parts of butyl glycol, 7.1 parts of toluene and 11.7 parts of ortho-dichlorobenzene.

The further steps are carried out in the manner described in the above Example I.

Example V

In the above Example I, the 40 parts of mica are substituted by another cleavable comminuted silicate of foliated structure, for example biodite, lepidolite, muscovite, paragonite, phlagopite, zinnwaldite, calcium titanium oxyorthosilicate, dioptasite, thermophyllite, antigorite, talcum, pyrophyllite and montmorillonite. The particle size of the silicate is substantially similar to that of the mica used in Example I.

A mixture of comminuted mica with one or more of the before mentioned other silicates, consisting for example of 50% of mica and 50% of the other silicate or silicates can likewise be substituted for mica in the above Example I.

Example VI

In the above Example I the mixture of the epoxy resin solution with the solution of the cross-linking ingredients is heated to temperatures in the range of 80° to 120° C. until complete homogenizing is obtained.

The other steps, ingredients and proportions used are the same as in the above Example I.

Example VII

An epoxy resin is prepared by condensation of 1 mol of bisphenol with 1.7 mols of epichlorhydrine in alkaline solution at about 80° C. 44 parts of this resin are dissolved in 38 parts of xylene, 4.1 parts of ethyl glycol and 17.1 parts of diacetone alcohol. 69 parts of this solution are mixed with 15 parts of a solution in 10 parts of ethyl glycol, 12 parts of xylene and 3 parts of i-butanol of a urea-formaldehyde condensation product, prepared by condensation of 1 mol of urea with 2 mols of formaldehyde and etherification of the condensation product with at least 1 mol of n-butanol for each methylol group. The resulting mixed solution is diluted with 17.3 parts of xylene and the resulting mixed solution (which contains the epoxy resin and the urea-formaldehyde resin serving as a cross-linking agent) is thoroughly mixed under stirring with 40 parts of comminuted mica, having a particle size as described hereinafter.

Example VIII

In the above Examples VII, instead of the 40 parts of comminuted mica, another cleavable silicate having a foliated structure, e. g., one of the silicates biodite, lepidolite, muscovite, paragonite, phlagopite, zinnwaldite, calcium titanium oxyorthosilicate, dioptasite, thermophyllite, antigorite, talcum, pyrophyllite and montmorillonite, or a mixture of them, can be used in an equal amount and with substantially the same particle size.

The compositions obtained according to the above examples are applied to the metallic backing according to conventional methods of applying lacquers, for example, by means of a spatula or spraying. It is preferred to supply several coatings, one upon the other. For example, in order to obtain a layer of 0.1 mm. thickness, 5 coatings are applied, whereby a short intermediate drying at elevated temperature is carried out after the application of each coating. After obtaining a layer of the desired total thickness, the coating formed is subjected to hardening by heating under atmospheric pressure or under a lower pressure. The hardening temperatures applied in this connection are dependent on the nature of the hardenable synthetic resins used and also on the nature of the cross-linking agents. The hardening temperatures do not exceed 300° C. and they are, for example, in the case of hardenable epoxy resin coatings, preferably in the range of 200°–300° C. In the case of coatings consisting of hardenable phenolic resins, the hardening temperature is preferably in the range of 180°–250° C. and in the case of coatings consisting of a mixture of an epoxy resin with a phenolic resin, in the range of 180°–300° C. By mechanical after-treatment of the resinous surface layer, for example, by turning, grinding or machining, the capillary passages present in the resinous layer are optimally opened, while simultaneously the resinous layer is smoothed and reduced to the desired thickness.

Figure 2:
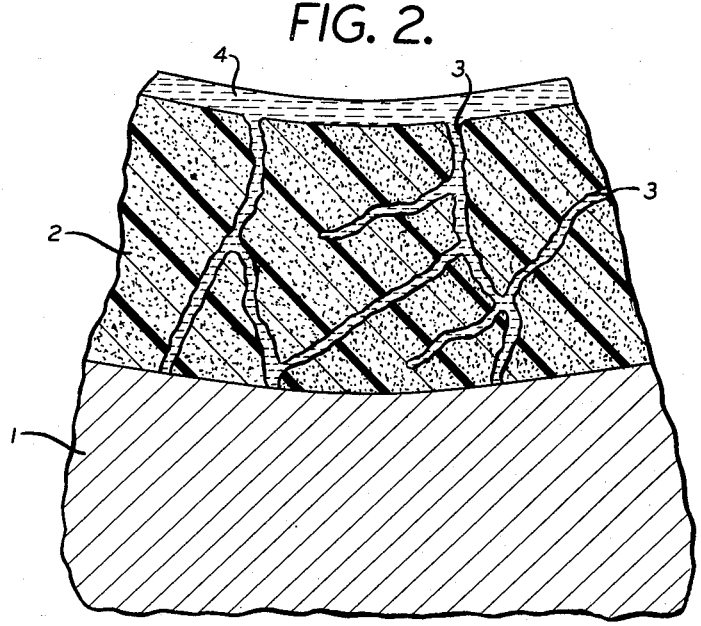

A bearing embodying the present invention is illustrated by way of example and without limitation in the appended drawings in which Fig. 1 diagrammatically illustrates a bearing, and Fig. 2 is a diagrammatic illustration of the capillaries formed in the synthetic resinous surface layer, on an enlarged scale.

Referring now to the drawings in detail, in Fig. 1 the bearing consists of a backing 1 which consists, for example, of iron, bronze or other metals or alloys. The inner surface of the ring shaped body 1 is provided with a coating or layer 2 of a hardened synthetic resinous composition containing particles of mica or the like, as a filler.

Fig. 2 illustrates on an enlarged scale the capillaries formed in layer 2 and the formation of a film 4 of the lubricant oil. As shown in Fig. 2, to the metallic backing 1 of the bearing a thin surface layer 2, consisting of hardened resinous composition is connected. Layer 2 is permeated by capillaries 3, the diameter of which are in the range of 2-4μ. The capillaries are connected with each other and a considerable number of them discharge to the surface of the resinous layer. The capillaries 3 extend mainly in perpendicular or similar direction relative to the inner bearing surface, but capillaries extending in other directions are also present in the resinous layer. It will be appreciated that these capillaries which are filled with oil, promote a quick transfer of heat in the direction of the metallic backing. It has been found that the capillaries extend throughout the entire resinous coating layer irrespective of the thickness of this layer.

The oil film 4 shown in Fig. 2 is formed from oil discharged by the capillaries, and as far as the practical requirements are concerned, it seems irrelevant whether this film is of uniform thickness over the entire bearing surface or has a locally increased thickness at the discharge openings of the capillaries. This continuous film of oil can be considered as anchored on the sliding surface by the action of the capillaries.

Reference is made to our co-pending application, filed in our names under Serial No. 300,382 on July 23, 1952, for Bearings, now Patent No. 2,772,930, of which this is a continuation-in-part.

It will be understood from the above that the bearings embodying the present invention comprise in combination a metallic backing and a thin surface layer of a synthetic resinous composition adhering to the metallic surface of the backing, hardened by heat under a pressure not exceeding atmospheric pressure and comprising a thermo-setting resin which undergoes shrinkage during polymerization and a comminuted filler which consists of an aluminum silicate of the type described above and has a stronger adhesion to the resinous binder than the inner adhesion forces of said filler, said layer containing a plurality of not oriented capillary passages, at least some of which discharge to the free surface of said layer and at least some of which are connected with each other. Owing to the presence of such capillary passages, said layer is capable of taking up and discharging lubricant. The parts herein are parts by weight if not otherwise stated.

It will also be understood that this invention is not limited to the specific steps, proportions, materials and other details specifically disclosed, and can be carried out with various modifications.

Thus, instead of mica in carrying out the present invention, other cleavable silicates which have a foliated structure and correspond to the general formula

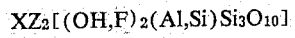

$$XZ_2[(OH,F)_2(Al,Si)Si_3O_{10}]$$

wherein X stands for one or more of the elements potassium, sodium, rubidium, cobalt; Z stands for one or more of the elements $Ti^{IV}$, $Fe^{II}$, $Mg$, $Mn^{II}$, $Al$, $Cr^{III}$, $Fe^{III}$, $Mn^{III}$, $V^{III}$ and $Ti^{III}$. Such silicates are also known as minerals of the mica class, as examples of which the following are mentioned: biodite, lepiodolite, muscovite, paragonite, phlagopite, zinnwaldite, calcium titanium oxyorthosilicate, dioptasite, thermophyllite, antigorite, talcum, pyrophyllite and montmorillonite. Any of these silicates or their mixtures can be used in carrying out the present invention substantially in the same manner as described in the above examples.

In connection with the various aldehyde resins described above, we prefer the formaldehyde resins, but resins formed with aldehydes other than formaldehyde, e. g., fufuraldehyde, may also be used.

As examples of alcoholates of polyvalent metals, the lower alcoholates, c. g., ethylates, of aluminum or titanium are mentioned. These alcoholates are prepared in conventional manner. Synthetic resins prepared by heating of these metal alcoholates with keto-enol compounds of tautomer reaction, which are capable to form an enolic-hydroxyl group or a keto-group—preferably ketocarboxylic acid esters, for example aceto-acetic esters, or β-diketones, such as formyl acetophenone—can also be used with excellent results as cross-linking agents for the epoxy resins. In the preparation of these last mentioned synthetic resins, a molecular ratio of metal to tautometer reacting compounds of 1:2.8 can be used, and the volatile ingredients have to be distilled off after resin formation.

It will be understood from the above that in carrying out the present invention the resinous binding agent consists of either hardenable epoxy resins or phenol-aldehyde resins, particularly phenol-formaldehyde resins, or mixtures of the hardenable epoxy resins with said phenolic resins, in the preparation of the resinous coating on the metallic backing or base of the bearings, while the other resinous products mentioned above are used as cross-linking agents only. Phenol-aldehyde resins can be used as binding agents, as well as cross-linking agents for the epoxy resins. The preferred type of mica and/or other cleavable silicates of foliated structure consists of particles which contain about 38% having an average surface of 0.03 mm.², about 54% having an average surface of 0.1 mm.², and about 8% having an average surface of 0.16 mm.². However, the comminuted fillers may have other distributions of the particle size in the range of individual particle surfaces between 0.2 and 0.02 mm.².

In order to carry out mending of damaged portions of the resinous bearing surface, first the residues of lubricants are removed therefrom. The damaged spot is then treated with a solvent such as dioxane, methylene dichloride or diethyl amine, in order to cause the resin to swell and a composition of resin and filler of mica or the like of the type described above is then applied to said spot. After drying the newly applied resin composition is hardened by heating and then subjected to finishing.

What is claimed is:

1. Bearing comprising in combination a metallic backing and a thin surface layer consisting of a synthetic resinous composition applied to the metallic surface of the backing and hardened under a pressure not exceeding atmospheric pressure; said resinous composition comprising a thermo-setting resin which undergoes shrinkage during polymerization, selected from the group consisting of hardenable epoxy resins, phenol-formaldehyde-resins and mixtures of these and a comminuted filler consisting of a cleavable silicate of foliated structure having a stronger adhesion to the resinous binder than the inner adhesion forces of said filler; said layer containing a plurality of capillary passages.

2. Bearing comprising in combination a metallic backing and a thin surface layer consisting of synthetic resinous composition applied to the metallic surface of the backing and hardened under a pressure not exceeding atmospheric pressure said resinous composition comprising a thermo-setting resin which undergoes shrinkage during polymerization selected from the group consisting of hardenable epoxy resins, phenolformaldehyde resins and mixtures of these and a comminuted filler consisting of a cleavable aluminium silicate of foliated structure having a stronger adhesion to the resinous binder than the inner adhesion forces of said filler; said layer containing a plurality of capillary passages, at least some of which discharge to the surface of said layer and at least some of which are connected with each other, said layer being capable of taking up and discharging lubricant.

3. Bearing as claimed in claim 1, in which the filler is comminuted mica.

4. Bearing as claimed in claim 3, in which the particles of mica have individual particle surfaces in the range between 0.02 and 0.2 mm.$^2$.

5. Bearing as claimed in claim 1, in which the proportion between the thermo-setting resin and the filler is in the range of 2 to 1.

6. Bearing as claimed in claim 3, in which the proportion by weight of synthetic resin and mica is in the range of 66–50% to 34–50%.

7. Bearing as claimed in claim 2, in which at least part of the capillary passages extends in a direction perpendicular to the free surface of the resinous layer.

8. Bearing as claimed in claim 1, in which the synthetic resin is a hardenable epoxy resin.

9. Bearing as claimed in claim 1, in which the resin is a hardenable phenol-formaldehyde resin.

10. Bearing as claimed in claim 1, in which the synthetic resin is a mixture of a hardenable epoxy resin and a hardenable phenol-formaldehyde resin.

11. Bearing as claimed in claim 1, in which the surface of the resinous layer is subjected to machining in order to obtain exact predetermined shape and dimensions of the layer.

No references cited.